United States Patent
Tanaka

[11] Patent Number: 5,879,254
[45] Date of Patent: Mar. 9, 1999

[54] PULLEY

[75] Inventor: Yasuhito Tanaka, Nara, Japan

[73] Assignee: Koyo Seiko Co., Ltd., Osaka, Japan

[21] Appl. No.: 905,948

[22] Filed: Aug. 5, 1997

[30] Foreign Application Priority Data

Aug. 22, 1996 [JP] Japan .................................. 8-220975
Oct. 14, 1996 [JP] Japan .................................. 8-270674

[51] Int. Cl.$^6$ .................................................. F16H 9/00
[52] U.S. Cl. ................................ 474/74; 192/113.32
[58] Field of Search ........................... 474/74, 94, 199, 474/902; 192/45, 113.32

[56] References Cited

U.S. PATENT DOCUMENTS

| | | | |
|---|---|---|---|
| 1,190,285 | 7/1916 | Gouldbourn | 474/171 X |
| 4,725,259 | 2/1988 | Miyata | 474/74 X |
| 4,754,859 | 7/1988 | Ouchi et al. | 192/45 |
| 4,913,271 | 4/1990 | Kinoshita et al. | 192/113.32 X |
| 5,156,573 | 10/1992 | Bytzek et al. | 474/74 |
| 5,517,957 | 5/1996 | Wagner et al. | 123/192.1 |

FOREIGN PATENT DOCUMENTS

| | | |
|---|---|---|
| 4426690C1 | 6/1995 | Germany . |
| 4442404A1 | 6/1996 | Germany . |
| 59-40060 | 3/1984 | Japan . |
| 60-150343 | 10/1985 | Japan . |
| HEI 280252 | 6/1990 | Japan . |

*Primary Examiner*—Thomas R. Hannon
*Attorney, Agent, or Firm*—Birch, Stewart, Kolasch & Birch, LLP

[57] ABSTRACT

A pulley has a hub fixed to a rotating shaft. An outer wheel is disposed on the outer periphery of the hub and around which a belt is suspended, and a unidirectional clutch is interposed between the hub and the outer wheel. A cam face for forming a wedged space of the unidirectional clutch is formed at the inside of the pulley, whereby the unidirectional clutch is switched between a free state and a locked state through the rotational variation of the hub which rotates integrally with the rotating shaft to reduce the transmission of the rotational variation from the hub to the outer wheel. Further, the unidirectional clutch can operate stably without suffering the effect of the rotational centrifugal force.

7 Claims, 9 Drawing Sheets

F I G. 12
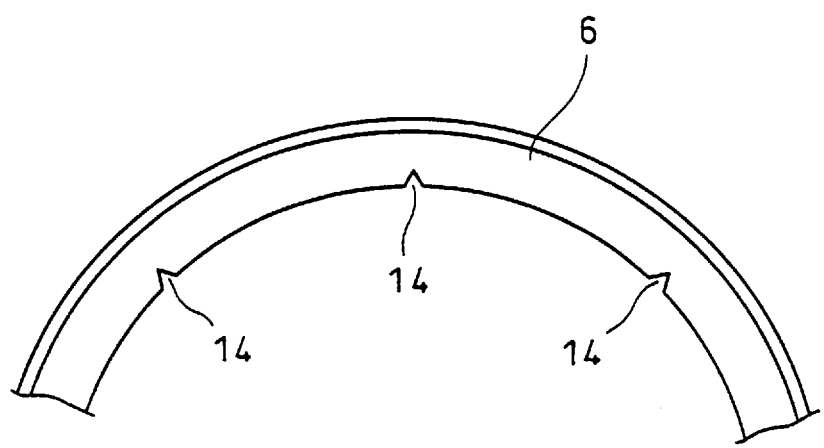

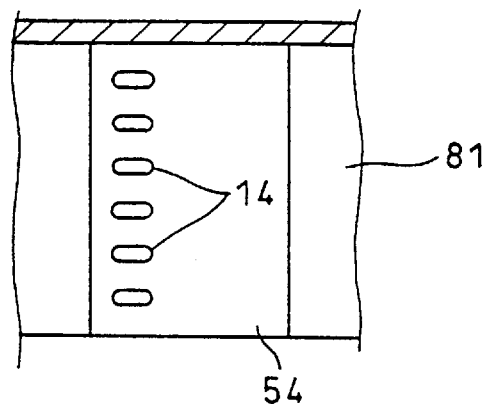
F I G. 13 (a)
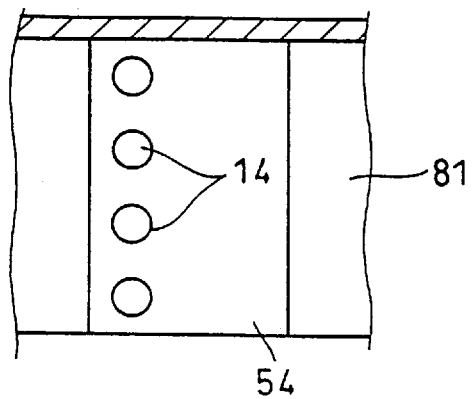
F I G. 13 (b)
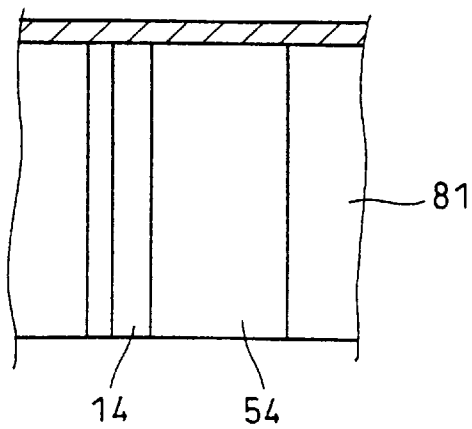
F I G. 13 (c)

PULLEY

BACKGROUND OF THE INVENTION

1. Field of the Invention

The present invention relates to a pulley, and particularly to a pulley which is mounted on the outer end of a crankshaft of an engine of a vehicle or the like.

2. Description of the Related Art

Conventionally, a pulley which is secured to a crankshaft is provided with a rubber damper to reduce such a phenomenon as torsional and flexural resonance of the crankshaft as disclosed in Japanese Laid-open Patent Application No. Sho-59-40060 and Japanese Laid-open Utility Model Application No. Hei-2-80252.

Since the phenomenon such as the torsional and flexural resonance of the crankshaft as described above occurs particularly at a high rotational number area (for example, above 2000 rpm) of the crankshaft, the characteristics of the rubber damper are designed so that the suppression of the above phenomenon is most effectively performed at this rotational number area.

It has been generally known that the crankshaft is advanced or delayed due to unevenness of explosion of a combustion chamber, resulting in variation of the rotational number. The variation of the rotational number of the crankshaft is more remarkable particularly at a low rotational number area such as an idling area (for example, around 1000 rpm). The variation of the rotational number of the crankshaft directly causes the rotational variation of the pulley, and thus the tension of a belt which is suspended around the pulley varies, so that the belt is slipped on the pulley to induce a belt noise or wear on the belt.

When the characteristics of the rubber damper is designed so that the variation of the rotational number of the crankshaft particularly at the idling rotation area is reduced by the rubber damper as described above, not only the suppression effect of the resonance phenomenon which is the original purpose to use the rubber damper is lowered, but also the durability of the rubber damper itself is reduced.

SUMMARY OF THE INVENTION

Therefore, an object of the present invention is to suppress the rotational variation of a pulley, and also prevent slippage of a belt.

In order to attain the above object, a pulley according to the present invention comprises a hub serving as a driving member which is fixed to a rotating shaft, an outer wheel serving as a driven member which is disposed on the outer periphery of the hub and around which a belt is suspended, and an unidirectional clutch which is interposed between the hub and the outer wheel, wherein a wedged-space forming cam face of the unidirectional clutch is provided at the inside thereof.

The outer wheel comprises a annular body of sheet metal, and a thin cylindrical member which is press-fitted to the inside face of the annular body. The outer wheel is formed of material having large specific gravity. The unidirectional clutch preferably comprises plural rollers, a holder having a pocket for accommodating the plural rollers, an outer wheel member disposed on the outer periphery of the holder, an inner wheel member which is provided with a wedged-space forming cam face at the position corresponding to the pocket of the holder, and an elastic member for pressing the rollers against to the narrow side of the wedged space. The outer wheel member of the unidirectional clutch serves as an outer wheel of the pulley, and the inner wheel member of the unidirectional clutch serves as a hub of the pulley. Further, a lubricant stock portion may be provided to the outer peripheral surface of the inner wheel portion of the unidirectional clutch or the inner peripheral surface of the holder. The elastic member of the unidirectional clutch is formed as a coil spring. The elastic member is disposed in the wedged space while displaced to the driving member side, and it is brought into contact with the center portion of the rollers in the shaft direction. The coil spring may be brought into contact with the rollers through a spring bearing member.

The pulley attenuates the transmission of the rotational variation from the hub to the outer wheel through a switching operation of the unidirectional clutch from a free state to a lock state due to the rotational variation of the hub which rotates integrally with the rotating shaft. That is in an area where the rotational speed of the rotating shaft and the hub increases, the unidirectional clutch is set to the lock state, and the hub and the outer wheel are integrally and synchronously rotated. On the other hand, when the rotational speed of the hub is lower than that of the outer wheel in an area where the rotational speed of the rotating shaft and the hub is reduced, the unidirectional clutch is set to the free state, and thus the transmission of the rotational driving force from the hub and the outer wheel is intercepted, so that the outer wheel is rotated by only the rotational inertial force. If the difference in the rotational speed between the hub and the outer wheel is equal to zero in the area where the rotational speed of the rotating shaft and the hub increases, the unidirectional clutch is set to the lock state, and the hub and the outer wheel are integrally and synchronously rotated.

If the outer wheel is constructed by the annular body of sheet metal and the thin cylindrical member which is press-fitted to the inside face, the material cost and the processing cost can be reduced. Further, if the rotational inertial force is adjusted to be increased by forming the outer wheel of material having large specific gravity, the effect of the rotational variation of the rotational shaft can be reduced.

Further, since the rollers of the unidirectional clutch generally suffer a centrifugal force during rotation, they are displaced outwardly in the radial direction. Here, it is assumed that the cam face of the unidirectional clutch is provided at the outer wheel member side. When the rollers are set to the lock state, the centrifugal force acts on the rollers so that the lock state of the rollers is changed to the free state. On the other hand, according to the present invention, since the cam face of the unidirectional clutch is provided at the inner wheel member side, the centrifugal force for changing the lock state to the free state hardly acts on the rollers. Therefore, the function of the unidirectional clutch is stabilized.

Still further, if some existing parts of the pulley are also used as the inner wheel member and the outer wheel member of the unidirectional clutch, no extra part is necessary, so that the cost can be further reduced and also the outside dimension can be reduced.

In addition, if the lubricant stock portion is provided on the outer peripheral surface of the inner wheel member of the unidirectional clutch or on the inner peripheral surface of the holder, the lubricant can be placed in and adjacent to portions of of the unidirectional clutch which require lubrication for a long term, resulting in enhancement of reliability.

Further, if the elastic member of the unidirectional clutch is formed of a coil spring and it is disposed so as to be displaced to the driving member side in the wedged space and brought into contact with the center portions of the rollers in the shaft direction, the elastic urging force of the coil spring can be applied to the rollers in good balance and with high efficiency so as to assist the autorotation of the rollers. Therefore, the rollers can be kept in the straight position even when the rollers are located at any position in the wedged space. Accordingly, the slippage of the rollers can be prevented, and the stabilization of the lock and free operation by the rollers can be enhanced.

Still further, if the coil spring is brought into contact with the rollers through the spring bearing member, the elastic urging force of the coil spring can be suitably applied to the rollers.

According to the present invention, even in such a condition that the rotation of the rotating shaft is pulsated, the pulsation can be rectified and the rotational variation can be reduced. Therefore, the variation of the tension of the belt which is suspended around the outer wheel of the pulley can be suppressed, and thus the slippage of the belt can be avoided, so that occurrence of belt noise and abrasion of the belt can be prevented and thus the lifetime of the belt can be enhanced. Further, by forming the outer wheel of the material having large specific gravity, the rotational inertial force of the outer wheel can be adjusted to be larger, whereby the effect of the rotational variation of the rotating shaft on the pulley can be reduced.

Other objects, constructions, operations and effects of the invention will become apparent more fully from the description given below, but is should be understood that the description and examples given below are intended to illustrate the invention, and not to limit the scope of the invention, since many modifications and variations of the examples disclosed herein are within the scope of the invention.

BRIEF DESCRIPTION OF THE DRAWINGS

The accompanying drawings, which are incorporated in and form a part of this specification, illustrate embodiments of the invention, and, together with the description, serve to explain the principles of the invention. In all these figures, like components are indicated by the same numerals.

FIG. 12 is a longitudinal sectional view of bushes at both sides of the unidirectional clutch; and FIGS. 13A, 13B, and 13C are plans development showing the shape of a lubricant stock portion shown in FIGS. 10 to 12.

DETAILED DESCRIPTION OF THE PREFERRED EMBODIMENTS

Preferred embodiments according to the present invention will be described with reference to FIGS. 1 to 13.

Figure 1:
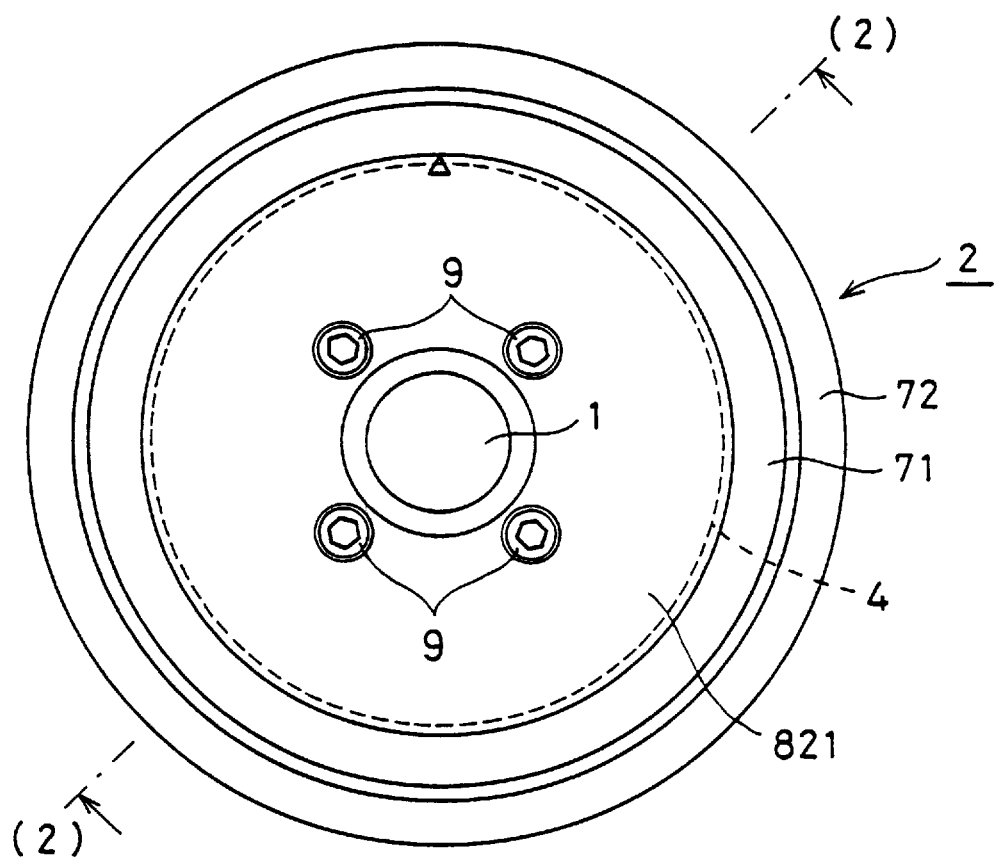
FIG. 1 is a front view showing a pulley according to an embodiment of the present invention.
Figure 2:
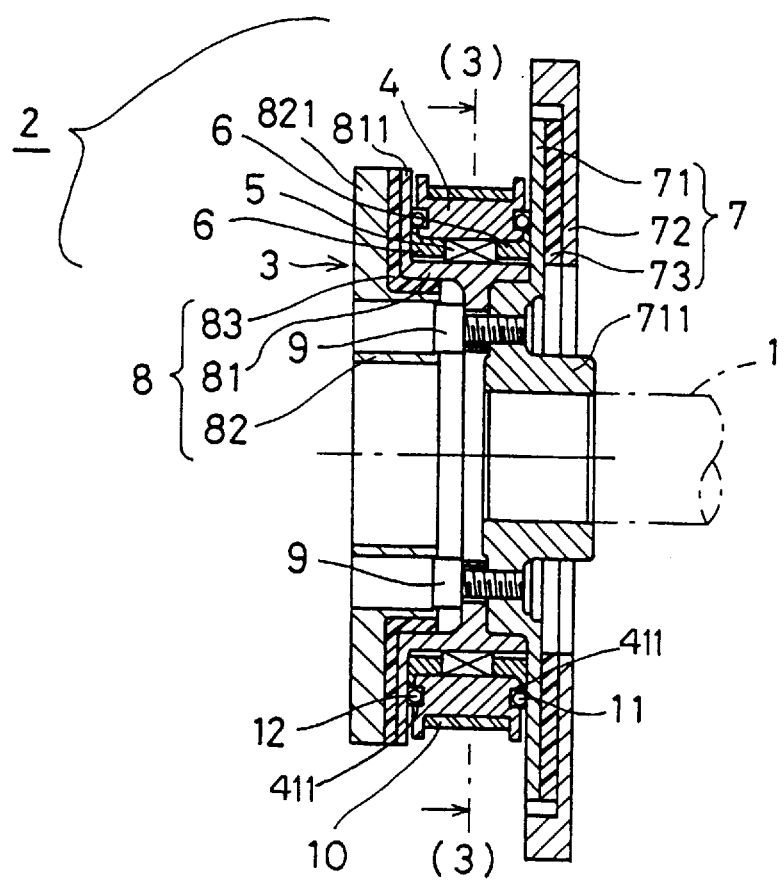
FIG. 2 is a cross-sectional view of the pulley which is taken along a line (2)—(2) of FIG. 1.
Figure 3:
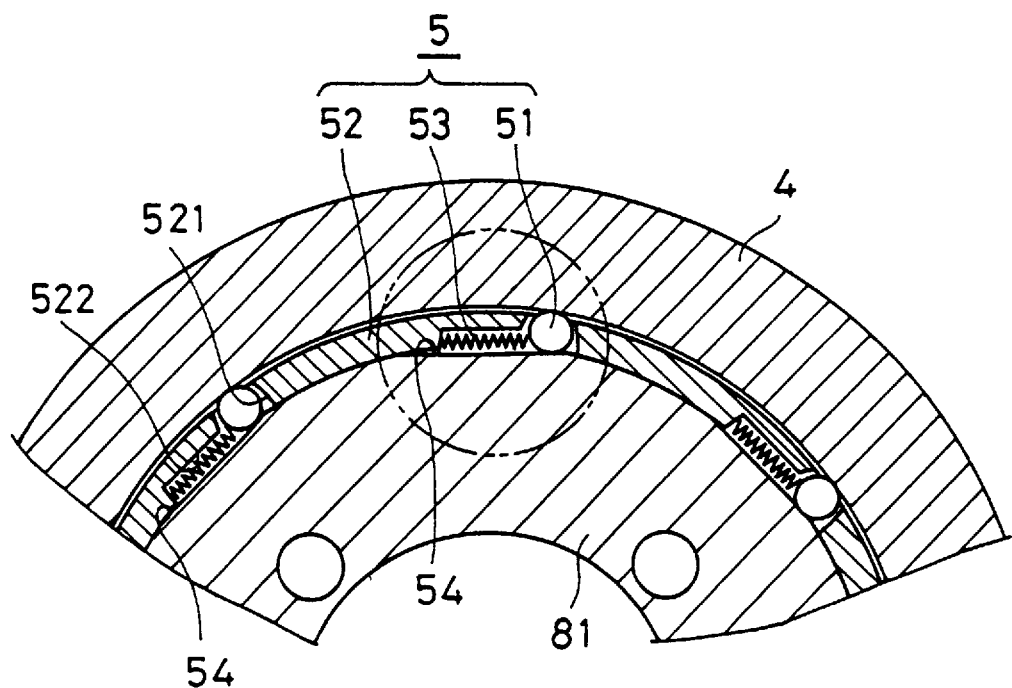
FIG. 3 is a cross-sectional view of the pulley which is taken along a line (3)—(3) of FIG. 2.
Figure 4:
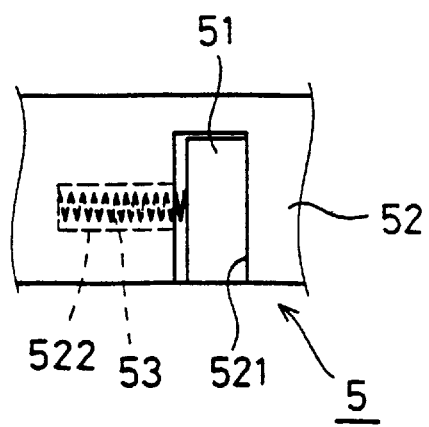
FIG. 4 is a plan development of a portion of the unidirectional clutch which is surrounded by a circle in FIG. 3.
Figure 5:
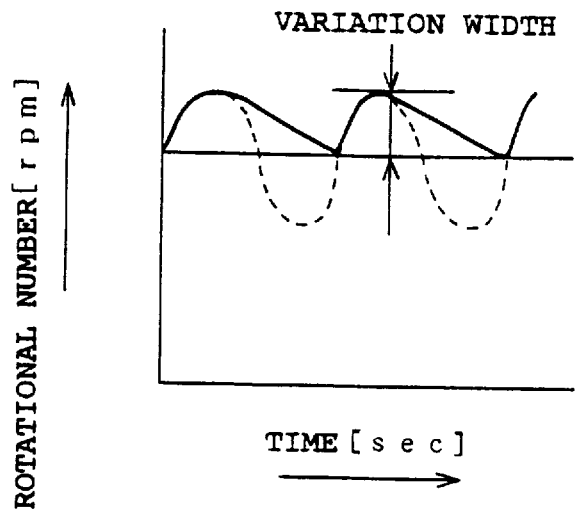
FIG. 5 is a graph showing the variation of the rotational number of the pulley.
Figure 6:
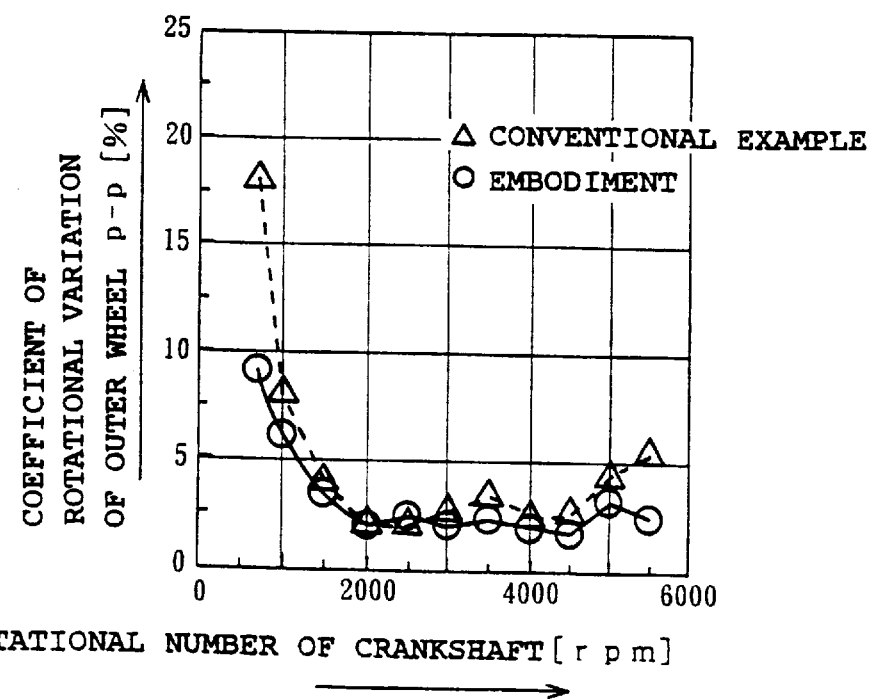
FIG. 6 is a graph showing the relationship between the rotational number of a crankshaft and the coefficient of the rotational variation of the pulley.

FIGS. 1 to 6 show an embodiment of the present invention. FIG. 1 is a front view of a pulley, FIG. 2 is a cross-sectional view which is taken along a line (2)—(2) of FIG. 1, FIG. 3 is a cross-sectional view which is taken along a line (3)—(3) of FIG. 2, FIG. 4 is a plan development showing a portion of an unidirectional clutch which is surrounded by a circle of FIG. 3, FIG. 5 is a graph showing the variation of the rotational number of the pulley, and FIG. 6 is a graph showing the relationship between the rotational number of a crankshaft and the coefficient of the rotational variation of the pulley.

In the figures, reference 1 represents a crankshaft, and reference numeral 2 represents a pulley which is mounted at the outer end of the crankshaft 1. The pulley 2 comprises a hub 3 serving as a driving member, an outer wheel 4 serving as a driven member, a unidirectional clutch 5 and bushes 6.

The hub 3 comprises two damper masses 7 and 8, and both the damper masses 7 and 8 are confronted to each other in the shaft direction and are integrally linked to each other by screws 9. The first damper mass 7 comprises a first annular plate 71 having a cylindrical boss 711 which is engaged with the crankshaft 1 on the inner periphery thereof, a second annular plate 72 which is coupled to the first annular plate 71 so that one surfaces of the first and second annular plates 71 and 72 are joined flat together, and a rubber damper 73 which is interposed between and adhesively attached to the annular plates 71 and 72.

The second damper mass 8 comprises a first cylinder portion 81 which is joined to the front side of the first annular plate 71 of the first damper mass 7 in the shaft direction by the screws 9 and is provided with a flange 811 extending outwardly in the radial direction at the front end thereof, a second cylinder portion 82 which is engagedly inserted and joined to the front side of the inner periphery of the first cylinder portion 81 and is provided with a flange 821 extending outwardly in the radial direction, and a rubber damper 83 which is interposed between and adheres to both the cylinder portions 81 and 82. The rubber dampers 73 and 83 are used to suppress the phenomenon such as the torsional and flexural resonance which occurs particularly in the high rotational speed area of the crankshaft 1.

The outer wheel 4 comprises a cylindrical member having grooves on the periphery of which the belt 10 is suspended, and it is disposed on the outer periphery of the first cylindrical portion 81 of the second damper mass 8 through the unidirectional clutch and the bushes 6. One side surface of the outer wheel 4 is disposed so as to confront the side surface of the first annular plate 71 of the first damper mass 7 in parallel through a minute gap, and the other side surface thereof is disposed so as to confront the side surface of the flange 811 of the first cylindrical portion 81 of the second damper mass 8 through a minute gap. Both the gaps are closed by O rings 11 and 12 respectively which are engagedly mounted in the recess grooves 411 on both the side surfaces of the outer wheel 4.

The unidirectional clutch 5 is interposed between the outer wheel 4 of the pulley 2 and the first cylinder portion 81 of the second damper mass 8 of the hub 3 of the pulley 2, and has plural rollers 51, a holder 52 having pockets 521 for accommodating the plural rollers 51, and coil springs 53 serving as elastic members which are accommodated in recess portions 522 intercommunicating with the pockets 521 of the holder 52 and adapted to press the roller 51 to the one inner wall surface side of the pocket 521. A cam face having key-shaped flat notches 54 extending along the shaft direction are formed at several positions on the outer peripheral surface of the first cylinder portion 81 of the second damper mass 8 in the hub 3, and the outside of the first cylinder portion 81 is designed to be polygonal. That is, plural wedged spaces are formed between the outer peripheral surface of the first cylinder portion 81 and the inner peripheral surface of the outer wheel 4, and each of the unidirectional clutches 5 is allocated to each of the wedged spaces.

Further, the coil spring 53 is disposed in the wedged space while displaced to the driving member side, that is, toward the inside and brought into contact with the center position of the roller 51 in the shaft direction as shown in FIG. 3 and 4, whereby the elastic urging force of the coil spring 53 can be applied to the roller in good balance and with high efficiency so as to assist the autorotation of the roller. Therefore, the roller can be kept in the straight position even when the roller is located at any position in the wedged space. Accordingly, the slippage of the rollers can be prevented, and the stabilization of the lock and free operation by the rollers 51 can be enhanced.

The bushes 6 are engagedly mounted at both sides in the shaft direction on the inner periphery of the outer wheel 4 of the pulley so that the unidirectional clutch 5 is sandwiched between the bushes 6 from both sides in the shaft direction, whereby the unidirectional clutch 5 is positioned in the shaft direction.

Next, the operation of the pulley 2 will be described.

The rotational number of the crankshaft 1 is normally varied like a sine-curve indicated by a broken line of FIG. 5 due to unevenness of explosion in a combustion chamber even when it is set to a fixed value. In accordance with the rotational variation of the crankshaft 1 as described above, the unidirectional clutch 5 in the pulley 2 is switched between the lock state and the free state, whereby the rotational variation of the outer wheel 4 of the pulley 2 is suppressed as indicated by a solid line of FIG. 5. That is, the hub 3 of the pulley 2 is fixed to the crankshaft 1, and thus it is rotated integrally with the crankshaft 1. However, the outer wheel 4 of the pulley 2 is designed to be rotated synchronously with the hub 3 by the unidirectional clutch 5 or rotate by its rotational inertial force, thereby suppressing the rotational variation of the outer wheel 4 of the pulley 2.

First, in the area where the rotational number of each of the crankshaft 1 and the hub 3 increases, the rollers 51 of the unidirectional clutch 5 are rolled to the narrow sides of the wedged spaces and kept under the lock state, so that the hub 3 and the outer wheel 4 are integrally and synchronously rotated. On the other hand, in the area where the rotational number of each of the crankshaft 1 and the hub 3 decreases, when the rotational speed of the hub 3 is lower than that of the outer wheel 4, the rollers 51 of the unidirectional clutch 5 are rolled to the broad sides of the wedged spaces and kept under the free state, so that the transmission of the driving force from the hub 3 to the outer wheel 4 is intercepted and thus the outer wheel 4 rotates by only the rotational inertial force thereof. When the difference in the rotational speed between the crankshaft 1 and the hub 3 is equal to zero in the area where the rotational speed of each of the crankshaft 1 and the hub 3 increases, the unidirectional clutch is set to the lock state, and the hub 3 and the outer wheel 4 are integrated and synchronously rotated together.

Through the operation as described above, the variation width (peak to peak) of the rotational number of the outer wheel 4 of the pulley 2 can be suppressed as indicated by the solid line of FIG. 5 although the rotational number of the hub 3 of the pulley 2 which is integrally rotated with the crankshaft 1 varies like a sine-curve as indicated by the broken line of FIG. 5. That is, the portion at the negative side of the sine curve is increased to the positive side as if the sine curve is passed through an electrical rectifying circuit. Accordingly, the tension variation of the belt suspended around the outer wheel 4 of the pulley 2 can be suppressed, and thus the slippage of the belt 10 can be avoided, so that the belt noise and the abrasion of the belt can be prevented.

The suppression effect of the rotational variation as described above will be described in detail. As shown in FIG. 6, according to this embodiment, the coefficient of rotational variation of the outer wheel 4 of the pulley 2 in the idling rotational area of the crankshaft 1, for example, around 600 rpm, can be reduced to about a half of the prior art. The coefficient of rotational variation can be calculated by dividing the variation (peak to peak) of the rotational number by the average rotational number.

Further, since the cam face 54 forming the wedged spaces of the unidirectional clutch 5 is formed on the outer peripheral surface of the first cylinder portion 81 of the second damper mass 8 serving as the inner wheel member, even when the rotational centrifugal force acts on the rollers 51, the rollers are merely pressed against the inner peripheral surface of the outer wheel 4, and no variation occurs in the wedged spaces of the unidirectional clutch 5, so that the function of the unidirectional clutch works stably. Particularly in the high rotational speed area where the centrifugal force is large, such a phenomenon that some rollers 51 fall into the free state although all the rollers are set to the lock state can be effectively prevented.

In the above-described embodiment, if in the driving force transmission path of the pulley 2, the unidirectional clutch 5 is disposed at the downstream side of the rubber dampers 73 and 83 of the hub 3 in the driving force transmission direction, the function of the unidirectional clutch 5 and the function of the rubber dampers 73 and 83 can work independently of each other. Therefore, even in such a condition that the unidirectional clutch 5 falls into the free state to intercept the transmission of the driving force from the hub 3 to the outer wheel 4, the action of attenuating (reducing) the resonance of the crankshaft 1 by the rubber dampers 73 and 83 can be effectively applied. If in the driving force transmission path of the pulley 2, the unidirectional clutch 5 is disposed at the upstream side of the rubber dampers 73 and 83 of the hub 3 in the driving force transmission direction, in such a condition that the unidirectional clutch 5 falls into the free state to intercept the transmission of the driving force from the hub 3 to the outer wheel 4, the attenuation action of the resonance of the crankshaft 1 by the rubber dampers 73 and 83 is not transmitted to the crankshaft 1, resulting in damage of the crankshaft 1.

Figure 7:
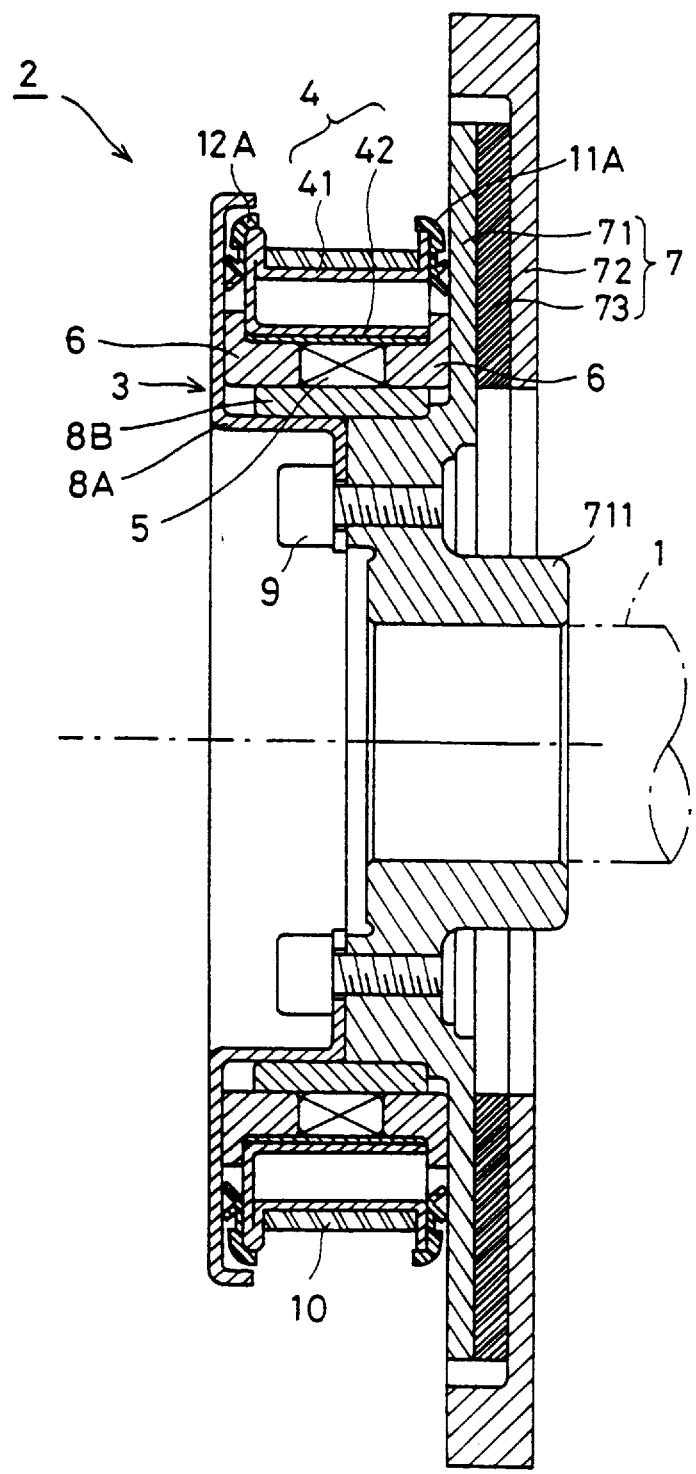
FIG. 7 is a cross-sectional view showing another embodiment of the pulley according to the present invention.

FIG. 7 is a longitudinal sectional view of a pulley according to another embodiment of the present invention. The difference in construction between this embodiment and the above-described embodiment resides in the hub 3 and the outer wheel 4.

The hub 3 comprises a first damper mass 7, a cover 8A of sheet metal, and an inner wheel 8B which is press-fitted to the outer periphery of a cylinder portion having a surface formed by the sheet metal cover 8A and the first damper mass 7, and on the outer periphery of which a cam face 54 of the unidirectional clutch 5 is formed. The inner wheel 8B serves as an inner wheel member of the unidirectional clutch 5.

The outer wheel 4 has a two-piece structure comprising an annular body 41 of sheet metal which is subjected to sheet metal processing to have a substantially U-shaped section at an upper portion thereof, and a thin cylinder member 42 which is press-fitted to the inside surface of the annular body 41 of the sheet metal. In place of the O-rings 11 and 12 of the above-described embodiment, seals 11A and 12A of rubber or the like are baked and adhere to the outer peripheral flange portion of the annular body 41 of the sheet metal. Further, the thin cylinder member 42 serves as the outer wheel member of the unidirectional clutch, and thus it is formed of a spring steel plate having high rigidity such as S60C-CSP of JIS standards or the like.

That is, in this embodiment, the hub 3 and the outer wheel 4 can be constructed at low price by aggregating elements which can be readily processed or members having simple shapes. If the cylinder portion at the inner peripheral side of the annular body 41 of the sheet metal is baked to enhance the rigidity thereof, the thin cylinder member 42 could be omitted.

The present invention is not limited to the above-described embodiments, and various applications and modifications may be made as follows.

(1) In the above-described embodiments, the structure of the hub 3 is set to the two-piece structure comprising two damper masses. However, the present invention may be applied to a one-piece structure.

(2) In the above-described embodiments, the coil spring 53 is used as the elastic member of the unidirectional clutch 5. In place of the coil spring 53, various leaf springs or elastic pieces may be used.

Figure 8:
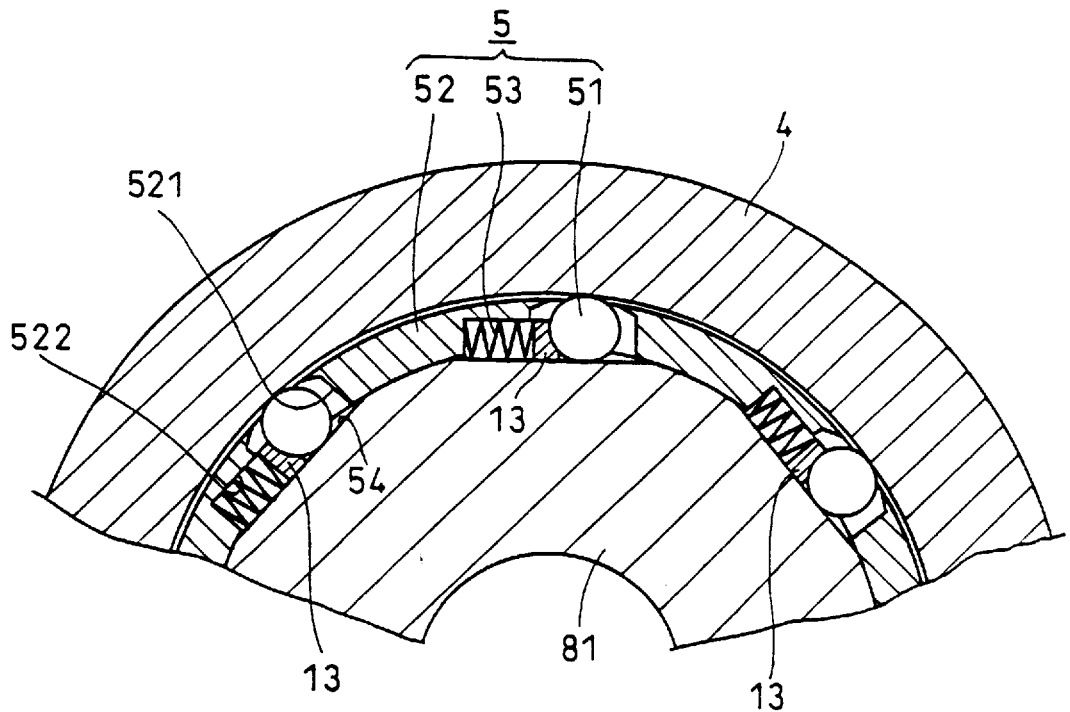
FIG. 8 is a diagram corresponding to FIG. 3 in another embodiment according to the present invention.
Figure 9:
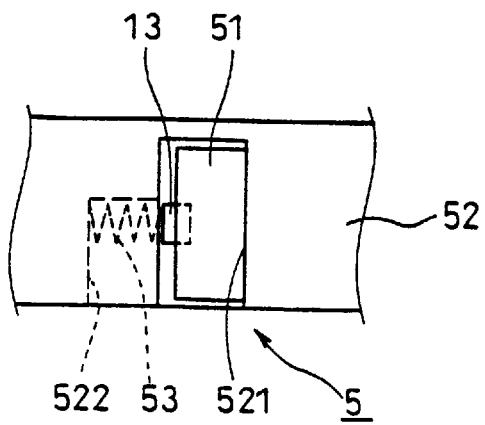
FIG. 9 is a diagram corresponding to FIG. 4 in another embodiment according to the present invention.

(3) In the above-described embodiments, the coil spring 53 can be brought into contact with the roller 51 through the spring bearing member 13 as shown in FIGS. 8 and 9. In these figures, The spring bearing member 13 is designed so as to have a flat surface at the coil spring 53 side and a curved surface at the roller 51 side, the curved surface being curved along the outer peripheral surface of the roller 51. In this case, the elastic urging force of the coil spring 53 can be properly applied to the roller 51.

(4) In the above-described embodiments, when a space for stocking lubricant such as grease in the mount space of the unidirectional clutch 5 is remarkably small, in order to compensate for the remarkably small space, a lubricant stock portion is preferably provided to at least one of the outer peripheral surface of the hub 3, the inner peripheral surface of the holder 52 and the inner peripheral surfaces of the bushes 6.

Figure 10:
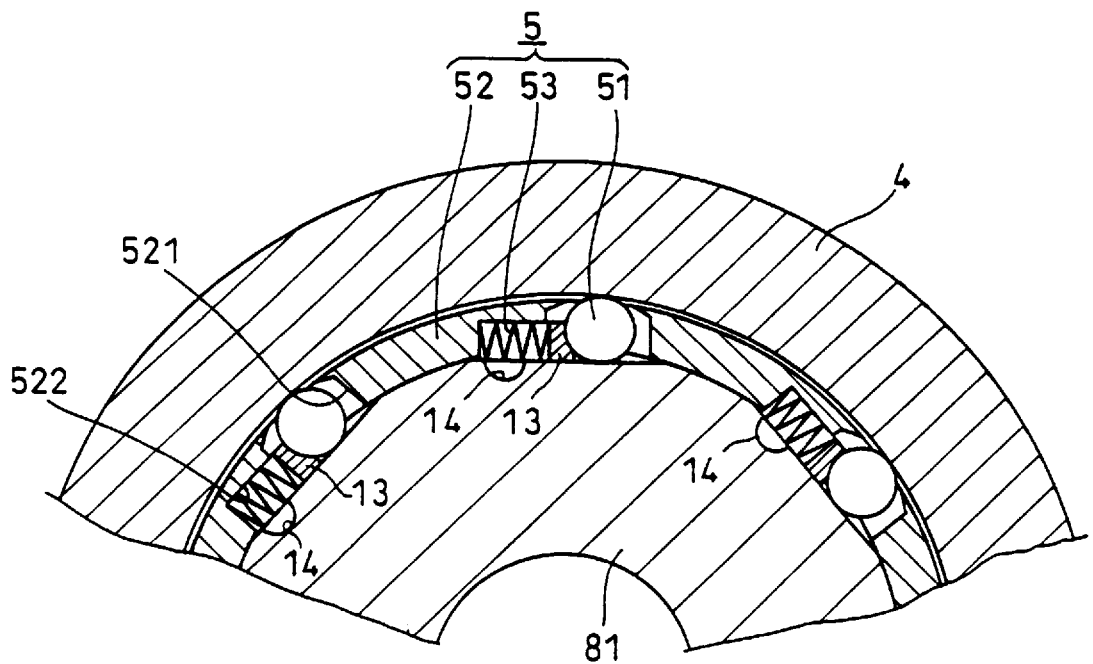
FIG. 10 is a diagram corresponding to FIG. 3 in another embodiment according to the present invention.
Figure 11:
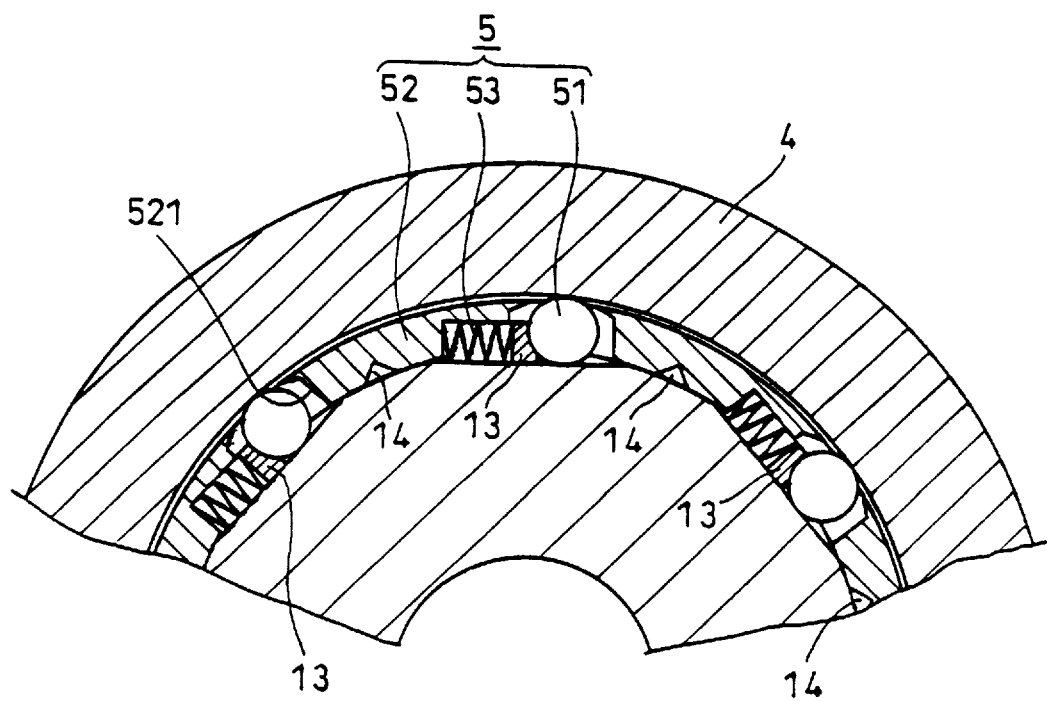
FIG. 11 is a diagram corresponding to FIG. 3 in another embodiment according to the present invention.

Specifically, lubricant stock portions 14 are provided at several positions (particularly in the neighborhood of the rolling area of the roller 51 of the unidirectional clutch 5) on the periphery of the outer peripheral surface of the first cylinder portion 81 of the first damper mass 8 constituting the hub 3 as shown in FIG. 10, or on the inner surface of the pillar portion between the neighboring pockets 521 in the holder 52 of the unidirectional clutch 5 as shown in FIG. 11, or at several positions on the periphery of the inner peripheral surfaces of the bushes 6 disposed at both sides of the unidirectional clutch 5 as shown in FIG. 12. As the lubricant stock portions 14, plural recess portions may be used which are designed in a substantially circular or elliptical shape in plan view, or a recessed groove which continuously extends from one end to the other end in the shaft direction as seen in FIG. 13. By providing the lubricant stock portions 14 as described above, the lack of the lubricant at the lubricant-needed portions of the unidirectional clutch 5 can be avoided for a long term. In addition, the lubricant in the lubricant stock portions 14 can be supplied through the gap between the unidirectional clutch 5 and the bushes 6 into the sliding portions of the O-rings 11 and 12, etc. so that the reliability can be enhanced.

(5) In the above-described embodiments, when the pulley setup space is restricted, the outside dimension of the pulley is also restricted, and the weight of the outer wheel 4 is lighter as compared with the prior art having no unidirectional clutch 5. Therefore, the rotational inertial force of the outer wheel 4 may be reduced so that the pulley is liable to suffer the effect of the rotational variation of the crankshaft 1. However, in these embodiments, no problem occurs because the pulley 2 is designed so as to hardly suffer the rotational variation. However, in this case, it is also preferable that the weight of the outer wheel 4 is managed to be properly adjusted to prevent the rotational inertial force from being reduced in consideration of the reduction in weight. Specifically, the outer wheel 4 of the pulley of each of the above-described embodiments may be formed of material having larger specific gravity than iron, for example, copper, lead or alloy thereof without changing the outside dimension. For example, the density of iron is equal to $7.85 \times 10^3$ kgf/m3, the density of copper is equal to $8.92 \times 10^3$ kgf/m3 and the density of lead is equal to $11.36 \times 103$ kgf/m3, and thus the weight is expected to be increased by about 14% when the material of the outer wheel 4 is changed from iron to copper, and by about 45% when the material of the outer wheel 4 is changed from iron to lead. When no restriction is imposed on the pulley setup space, general iron is used for the outer wheel 4, and the outside dimension of the outer wheel 4 (the thickness in the radial direction or the width in the shaft direction) may be changed to adjust the weight of the outer wheel 4. Of course, the adjustment of the weight of the outer wheel 4 may be performed in combination of the alteration of the outside dimension and the alteration of the material.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A pulley comprising:

a hub serving as a driving member which is fixed to a rotating shaft;

an outer wheel serving as a driven member which is disposed on the outer periphery of said hub and around which a belt is suspended;

a unidirectional clutch which is interposed between said hub and said outer wheel, wherein a wedge-space forming cam face of said unidirectional clutch is provided at the inside thereof;

first means for damping said pulley; and second means for damping said pulley, said hub is interposed between said first and second damping means, said unidirectional clutch includes plural rollers, a holder having pockets for accommodating said plural rollers, said outer wheel member is disposed on the outer periphery of said holder, an inner wheel member is provided with said wedge-space forming cam face at a position corresponding to said pockets of the holder, and elastic members for pressing each of said rollers against a narrow side of a respective wedged space, whereby said clutch substantially suppresses rotational variation of said outer wheel while substantially preventing slippage of the belt.

2. The pulley as claimed in claim 1, wherein said outer wheel is formed of material having large specific gravity.

3. The pulley as claimed in claim 1, wherein said outer wheel member of said unidirectional clutch serves as an outer wheel of said pulley, and said inner wheel member of said unidirectional clutch serves as a hub of the pulley.

4. The pulley as claimed in claim 1, wherein a lubricant stock portion is provided at an outer peripheral surface of the inner wheel portion of said unidirectional clutch or at an inner peripheral surface of said holder.

5. The pulley as claimed in claim 1, wherein each elastic member of said unidirectional clutch includes a coil spring, each spring is disposed in a respective wedged space while biasing a respective driving member side and contacting a center portion of a respective roller in a shaft direction.

6. The pulley as claimed in claim 1, wherein each elastic member of said unidirectional clutch includes a coil spring and a spring body member, each spring is disposed in a respective wedged space while biasing a respective driving member side and contacting a center portion of a respective roller in a shaft direction through a respective spring bearing member.

7. A pulley comprising:

a hub serving as a driving member which is fixed to a rotating shaft;

an outer wheel serving as a driven member which is disposed on the outer periphery of said hub and around which a belt is suspended; and a unidirectional clutch which is interposed between said hub and said outer wheel, wherein a wedge-space forming cam face of said unidirectional clutch is provided at the inside thereof, said outer wheel includes an annular body of sheet metal, and a thin cylindrical member which is press-fitted to the inside face of said annular body.

* * * * *